B. F. HARDWICK.
Cotton and Corn-Planters.
No. 146,251.  Patented Jan. 6, 1874.
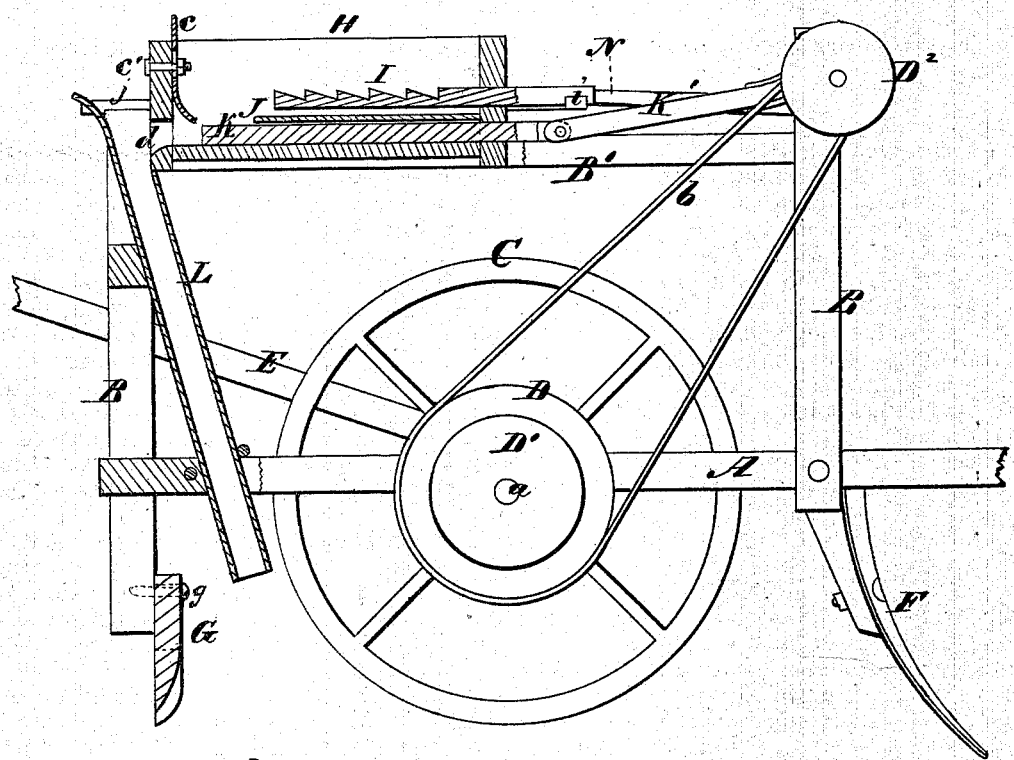
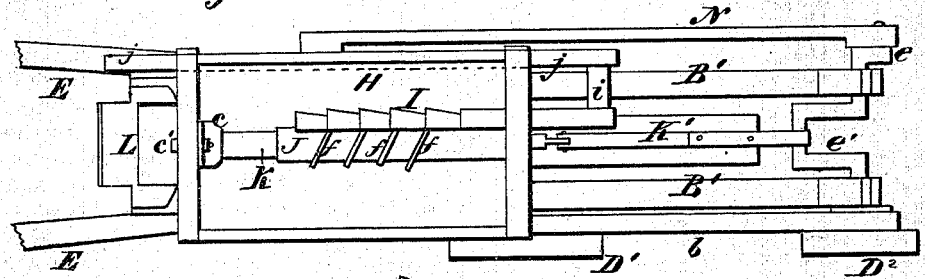
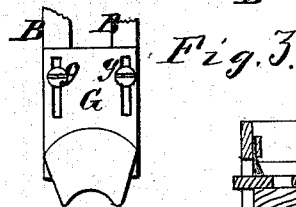

UNITED STATES PATENT OFFICE.

BENJAMIN F. HARDWICK, OF BRYANTSVILLE, KENTUCKY, ASSIGNOR OF ONE-HALF HIS RIGHT TO DAVIS C. KING, OF SAME PLACE.

IMPROVEMENT IN COTTON AND CORN PLANTERS.

Specification forming part of Letters Patent No. 146,251, dated January 6, 1874; application filed November 8, 1873.

*To all whom it may concern:*

Be it known that I, BENJAMIN F. HARD-WICK, of Bryantsville, in the county of Garrard and State of Kentucky, have invented a new and valuable Improvement in Cotton and Corn Planter; and I do hereby declare that the following is a full, clear, and exact description of the construction and operation of the same, reference being had to the annexed drawings making a part of this specification and to the letters and figures of reference marked thereon.

Figure 1 of the drawing is a representation of a sectional view of my cotton and corn planter. Fig. 2 is a plan view of the same. Fig. 3 is a detail view of the same.

This invention has relation to machines which are especially designed for planting cotton-seed, but which may be used for planting corn. The nature of my invention consists in a rectilinear reciprocating feeder and stirrer, which is arranged above a horizontal division plate in the hopper, and which is serrated transversely, and provided with oblique spurs, in combination with a reciprocating discharger, which is arranged below said division-plate, and operated so as to push the seeds below an adjustable cut-off and out of the hopper.

In the annexed drawings, A represents a draft-beam, from which rises perpendicularly four standards, B, connected together near their upper ends by means of longitudinal bars B'. These parts constitute the frame of the machine, which is supported upon the axle $a$ of a transporting and driving wheel, C. From the axle $a$ motion is imparted to a shaft on which are two cranks, $e\ e'$, by means of pulleys D D². E E are the handles of the planter, which are secured to the beam A, and also to the rear standards B B, and are used like plow-handles for guiding the machine. F represents a shovel or opening tooth, which is secured to the frame near its front end, and intended for opening the soil to receive the seed. At the rear end of the frame, and connected to the lower ends of the rear standards B B, is a coverer, G, which is vertically self-adjusting, and which is connected to said standards by means of screws $g$, passed through vertical slots. This coverer, which presents a front concave surface, and a notched lower end, will accommodate itself to the inequalities of the surface passed over, and cover the seed in the hills uniformly without the special attention of the person managing the machine. L represents the discharge-tube, which extends upward and backward, and terminates in an open end at the rear end of the seed-hopper H, where it receives the charges of seed from an opening, $d$. The hopper H has two inclined sides, which, in a cross-section, gives to it a V shape; and on the bottom of this hopper slides a plunger or discharger, K, which receives its movement from the crank $e'$ through a pitman-rod, K'. This discharger K is arranged beneath a horizontal division-plate, J, which extends from the front end of the hopper nearly to its rear end, where a space is left for the seed to fall behind the discharger to be forced out of the hopper beneath a cut-off, $c$, and through hole $d$. The cut-off $c$ is secured to the rear end of the hopper, inside, by means of a set screw, $c'$, which will allow this cut-off to be raised or lowered for increasing or diminishing the size of the discharge-opening. Above the division-plate J is a longitudinally-moving feeder and stirrer, I, which alternates in its movements with the discharger K, and which is connected to the crank $e$ by means of rods $i$ N. The top and one side of this feeder I are serrated like saw-teeth, their pitch being toward the rear end of the hopper, and on one side of this feeder are fixed a number of long spurs, $f$, also directed toward the rear end of the hopper.

This feeder moves the cotton-seeds backward, and compels them to fall behind the discharger, which then forces the seeds out of the hopper and into the tube L. As the feeder I recedes, the seeds are separated from each other by a stirring action of its teeth and spurs.

By removing the hopper H, and applying in its place a hopper shown by Fig. 4, the machine may be used for planting corn.

What I claim as new, and desire to secure by Letters Patent, is—

The serrated and spurred feeder I and discharger K, alternating with each other in their movements, and arranged in a hopper, H, on opposite sides of a division-plate, J, for discharging cotton-seed, as herein described.

In testimony that I claim the above I have hereunto subscribed my name in the presence of two witnesses.

BENJAMIN F. HARDWICK.

Witnesses:
PHIL. C. MASI,
GEORGE E. UPHAM.